United States Patent [19]
Masuda et al.

[11] Patent Number: 5,671,968
[45] Date of Patent: Sep. 30, 1997

[54] BODY STRUCTURE FOR MOTOR VEHICLE

[75] Inventors: Toshio Masuda, Ashikaga; Masayuki Honma, Ora, both of Japan

[73] Assignee: Fuji Jukogyo Kabushiki Kaisha, Tokyo, Japan

[21] Appl. No.: 760,632

[22] Filed: Dec. 4, 1996

Related U.S. Application Data

[63] Continuation of Ser. No. 510,531, Aug. 2, 1995, abandoned.

[30] Foreign Application Priority Data

Aug. 31, 1994 [JP] Japan ................... 6-230466

[51] Int. Cl.$^6$ ................................................ B65D 25/02
[52] U.S. Cl. .................. 296/188; 296/189; 296/203; 296/204; 296/209; 296/29; 296/30; 296/210
[58] Field of Search ...................... 296/29, 30, 187–189, 296/203, 204, 209, 210

[56] References Cited

U.S. PATENT DOCUMENTS

| | | | |
|---|---|---|---|
| 1,602,913 | 10/1926 | Leipert | 296/29 |
| 2,301,593 | 11/1942 | Ulrich | 296/204 X |
| 2,380,523 | 7/1945 | Hicks | 296/204 |
| 4,068,884 | 1/1978 | Watanabe et al. | 296/204 X |
| 4,081,197 | 3/1978 | Ackel | 296/204 |
| 4,470,619 | 9/1984 | Imajyo et al. | 296/30 X |
| 4,514,008 | 4/1985 | Watanabe et al. | 296/204 |
| 4,572,571 | 2/1986 | Malen | 296/204 X |
| 4,747,636 | 5/1988 | Harasaki et al. | 296/203 X |
| 4,892,350 | 1/1990 | Kijima et al. | 296/204 |
| 4,934,751 | 6/1990 | Shimoda | 296/188 |
| 5,042,872 | 8/1991 | Yoshii | 296/209 X |
| 5,213,386 | 5/1993 | Janotik et al. | 296/204 X |
| 5,246,264 | 9/1993 | Yoshii | 296/203 |

FOREIGN PATENT DOCUMENTS

| | | | |
|---|---|---|---|
| 1800778 | 10/1970 | Germany | 296/203 |
| 3119666 | 1/1982 | Germany | 296/203 |
| 62-39375 | 2/1987 | Japan | 296/209 |
| 125956 | 6/1987 | Japan | 296/204 |
| 62-258868 | 11/1987 | Japan | 296/209 |
| 2-283578 | 11/1990 | Japan | 296/209 |
| 4154458 | 5/1992 | Japan | 296/203 |
| 4-215574 | 8/1992 | Japan | 296/209 |
| 5-185960 | 7/1993 | Japan | 296/209 |
| 6211164 | 8/1994 | Japan | 296/203 |
| 6263062 | 9/1994 | Japan | 296/203 |
| 1356112 | 6/1974 | United Kingdom | 296/203 |

OTHER PUBLICATIONS

Abstract of Japanese Patent 6–270845 translated in English dated Sep. 1994.
Abstract of Japanese Patent 2–141372 translated in English dated May 1990.
Abstract of Japanese Patent 6–211167 translated in English dated Aug. 1994.
Abstract of Japanese Patent 60–259577 translated in English dated Dec. 1985.
Abstract of Japanese Patent 5–97057 translated in English dated Apr. 1993.

*Primary Examiner*—Dennis H. Pedder
*Attorney, Agent, or Firm*—Beveridge, DeGrandi, Weilacher & Young, LLP

[57] ABSTRACT

A motor vehicle having a continuous closed cross sectional structure therearound. The vehicle includes a center pillar and a side sill, both of which are connected with a doubler extended transversely. A center roof brace is connected with the upper end of the center pillar through a joint member. The outside end of the doubler is connected with the center pillar in such a manner that it laps the lower end of the center pillar. Further, the doubler is connected with a center tunnel which is reinforced from underneath. The center pillar, the doubler and the center roof brace have a closed cross section respectively. The center pillar includes a strength discontinuity portion at the lower portion thereof. In the event of a side impact, the center pillar yields toward the inside direction of the vehicle at the strength discontinuity portion without bending the upper portion thereof and the amount of deformation of the center pillar is controlled.

18 Claims, 5 Drawing Sheets

BODY STRUCTURE FOR MOTOR VEHICLE

This application is a continuation of application Ser. No. 08/510,531, filed Aug. 2, 1995, now abandoned, which application is entirely incorporated herein by reference.

BACKGROUND OF THE INVENTION

1. Field of the Invention

The present invention relates to a body structure of a motor vehicle and particularly to a cross sectional structure of a center pillar.

2. Prior Art

A Japanese Utility Model Application No. Jitsu-Kai-Sho 61-7473 discloses a technique in which a center pillar has a closed cross section formed by a center pillar inner panel and a center pillar outer panel. Further, the upper end of the center pillar is connected with a roof side rail and the lower end thereof is connected with a side sill. Further, a reinforcement is disposed throughout from the top to the bottom of the center pillar for increasing strength. Furthermore, a center roof brace having a closed cross section and a cross member also having a closed cross section are connected with each other through the center pillar. Thus a closed cross section is formed throughout around the vehicle cross section, whereby the rigidity of the entire body is enhanced.

Generally, a thus constituted center pillar has a strength discontinuity portion near the middle part thereof, i.e., at a position where the cross section is abruptly changed by windows. When a side impact is applied to the side face of the vehicle, the center pillar 1 is largely bent in the inside direction of the vehicle at this strength discontinuity portion, as illustrated in FIG. 6b. As a result of such impact, the occupants are seriously injured by the center pillar protruding into the vehicle compartment.

In order to avoid this disadvantage, the applicant of the present invention has proposed an improved center pillar in Japanese Utility Model Application No. Jitsu-Gan-Hei 5-20244. In this prior art there is intentionally provided with a strength discontinuity portion, i.e., a portion easy to bend when a side force is applied thereto at the lower part of the center pillar 1 so as to alleviate an impact on the occupants by reducing the amount of deformation of the center pillar 1, as shown in FIG. 6a.

In the center pillar positively having the strength discontinuity portion like this, in order for the center pillar to surely bend at the strength discontinuity portion and not to bend at the upper portions thereof above the middle portion, it is important to make a tuning of strength to other associated portions such as an upper and lower jointing portion of the center pillar with other body structures as well as to the strength discontinuity portion.

That is to say, when an impact load occurs to the lower portion of the center pillar, at the initial stage of impact it is necessary that other body structures connected with the upper and lower end of the center pillar firmly receive the impact load without being deformed in the inside direction. In this case, if those other body structures are not able to withstand and easily yield, as a result of this, the strength discontinuity portion bends insufficiently or awkwardly. Further, even if it bends expectedly, the amount of deformation of the center pillar into the compartment becomes large.

When this center pillar structure having the strength discontinuity portion is applied to the aforementioned prior art constituted by the closed cross section, the upper end of the center pillar receives the impact load by the closed cross sectional structure of the center roof brace, however, the lower end of the center pillar is largely deformed in the inside direction of the vehicle before the outer panel of the side sill is collapsed, because at first the center tunnel is collapsed by the impact load transferred thereto through the cross member.

SUMMARY OF THE INVENTION

Accordingly, the present invention is intended to solve the abovementioned disadvantages of the prior arts and it is summarized as follows.

It is an object of the present invention is to provide a body structure capable of protecting the occupants from serious injury in the event of a side impact.

A body structure of a motor vehicle has a center pillar including a center pillar inner panel, a center pillar outer panel and a reinforcement, a roof side rail extended in a lengthwise direction of said vehicle, a side sill extended in a lengthwise direction of the vehicle, the side sill including a side sill inner panel, a center roof brace extended in a transverse direction of the vehicle and connected with the center pillar and with the roof side rail, a doubler extended in a transverse direction of the vehicle and connected at an outside end thereof with a lower end of the center pillar and with said side sill, said doubler including at least one U-shaped channel, a floor panel, and a center tunnel extended in a lengthwise direction of the vehicle and connected with the doubler at an inside end thereof.

In particular, the body structure according to the present invention includes a closed cross section provided in the center pillar and formed by the center pillar inner panel, the center pillar outer panel, and the reinforcement;

- a closed cross section provided in a roof side rail;
- a closed cross section provided in the side sill;
- a closed cross section provided in the center roof brace;
- a closed cross section provided in the doubler and formed by the U-shaped channel and the floor;
- a tunnel reinforcement connected with the center tunnel underneath of the center tunnel;
- a closed cross section provided in the center tunnel and formed by the center tunnel and by the tunnel reinforcement;
- a continuous closed cross sectional structure constituted by the closed cross sections of the center pillar, the center roof brace, the doubler, the floor tunnel; and
- a joint member for connecting the center roof brace and the center pillar.

BRIEF DESCRIPTION OF THE DRAWINGS

FIG. 5c is a cross sectional view showing a section C—C of a center pillar in FIG. 5a;

FIG. 5d is a cross sectional view showing a section D—D of a center pillar in FIG. 5a;

FIG. 5e is a cross sectional view showing a section E—E of a center pillar in FIG. 5a;

FIG. 5f is a cross sectional view showing a section F—F of a center pillar in FIG. 5a;

DETAILED DESCRIPTION OF THE PREFERRED EMBODIMENTS

Embodiments according to the present invention will be described in detail by referring to the accompanying drawings.

Figure 1:
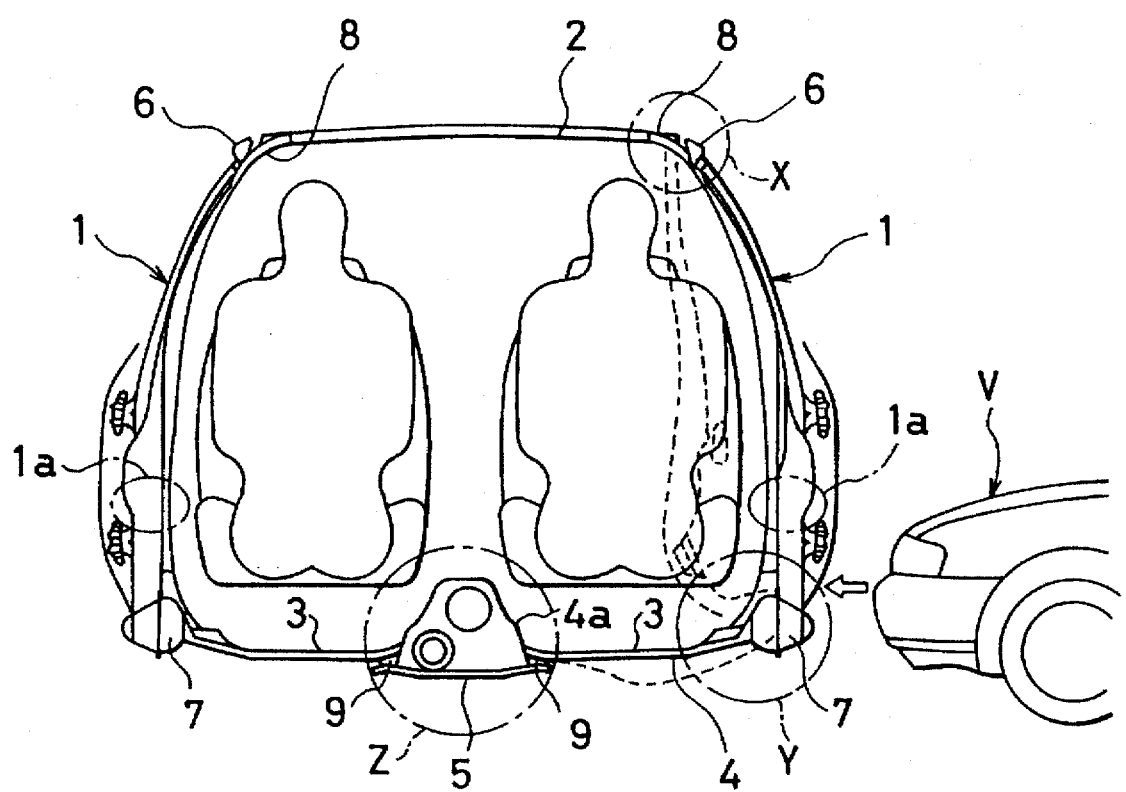
FIG. 1 is a cross sectional view according to an embodiment of the present invention.

Referring now to FIG. 1, numeral 1 denotes a center pillar, numeral 2 denotes a center roof brace, numeral 4 denotes a floor panel and numeral 3 denotes a doubler transversely fixed on the floor panel 4. The center pillar 1 has a closed cross section formed by a center pillar inner panel 11 and a center pillar outer panel 12 and is connected at an upper end thereof with a roof side rail 6 and is connected at a lower end thereof with a side sill 7. The roof side rail 6, the doubler 3 and the side sill are constituted by a closed cross section respectively. Further, a strength discontinuity portion 1a with respect to an input load applied from the side face of the vehicle body is provided near the middle portion of the center pillar 1. The detailed structure of the strength discontinuity portion 1a will be described hereinafter.

In the center roof brace 2 a closed cross section is formed by a center roof brace lower panel 21 and a center roof brace upper panel 22 and the left and right end thereof is connected such as by welding with the roof side 6 respectively. Further the center roof brace 2 is connected, such as by welding with the center pillar 1 through a joint member 8.

Figure 2A:
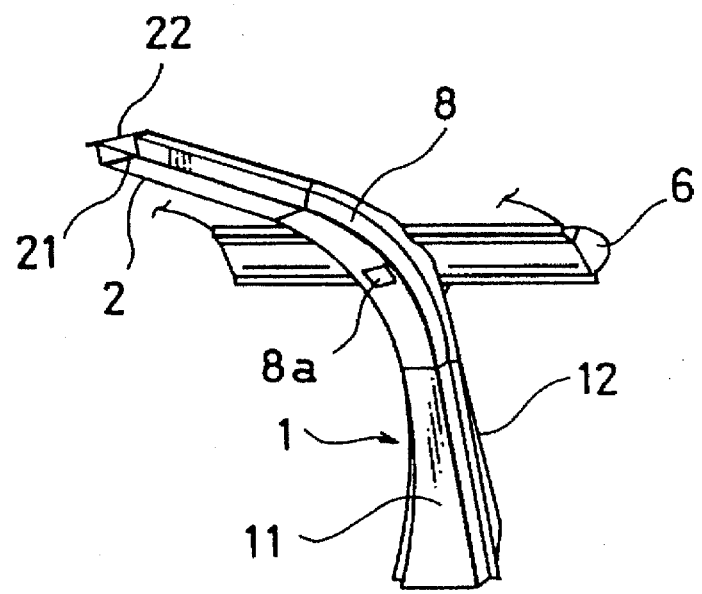
FIG. 2a is a perspective view showing a portion X in FIG. 1, particularly showing a connecting portion of a center pillar inner panel and a center roof brace.
Figure 2B:
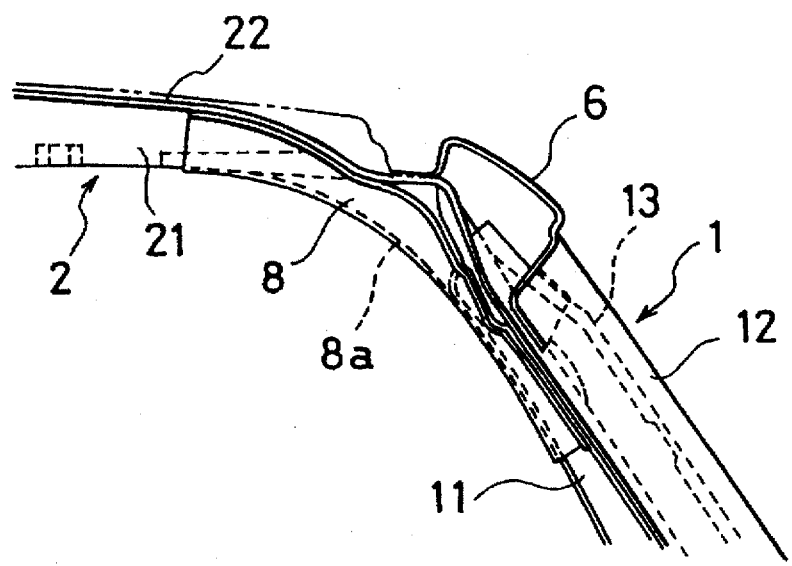
FIG. 2b is a cross sectional view of a portion X.

As shown in FIG. 2a, the joint member 8 is constituted by a U-shaped channel whose upper and lower portions are lapped on and spot-welded to the center roof brace lower panel 21 and the center pillar inner panel 11 respectively such that the center roof brace 2 is connected in a smooth circular arc with the center pillar 1. Further, on the joint member 8 there is provided with a tuning hole 8a around which the center pillar 1 is easy to bend when a side impact is applied to the center pillar, as shown in FIG. 1.

Figure 3A:
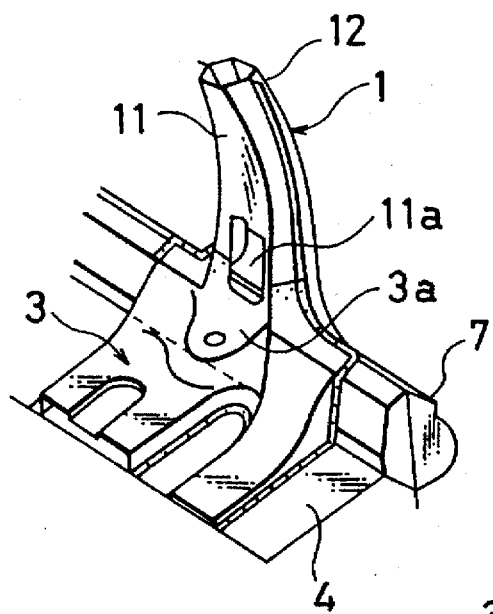
FIG. 3a is a perspective view showing a portion Y in FIG. 1, particularly showing a connecting portion of an end portion of a center pillar inner panel and a floor panel with a doubler.
Figure 3B:
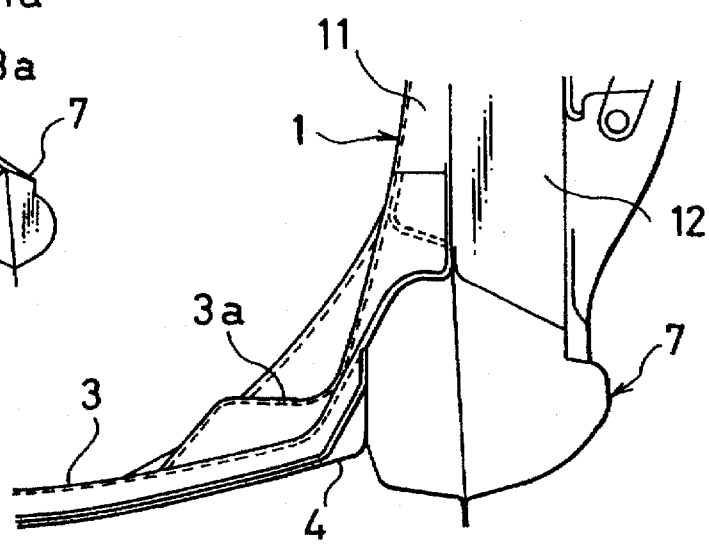
FIG. 3 is a cross sectional view of a portion Y.
Figure 4A:
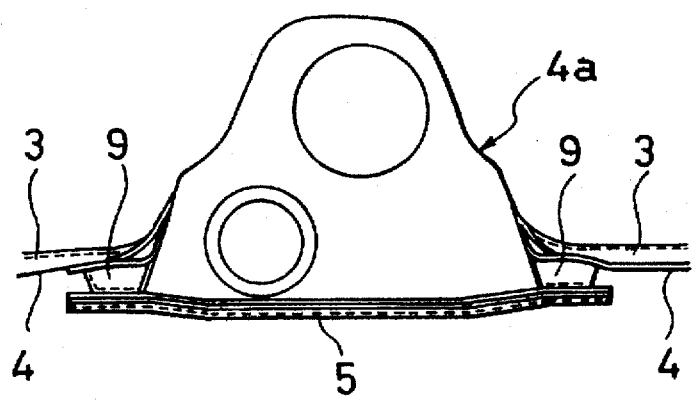
FIG. 4a is a cross sectional view showing a portion Z in detail.
Figure 4B:
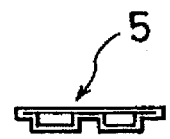
FIG. 4b is a view showing a tunnel reinforcement.

The doubler 3, as shown in FIG. 3a, has a closed cross section formed by U-shaped channels and the floor panel 4. The outer end of the doubler 3 is shaped in a circular arc and connected with the side sill inner panel and at the same time welded to the center pillar 1 such that the outer end of the doubler 3 laps the lower end of the center pillar inner panel 11. The inner end of the doubler 3, as shown in FIG. 4a, is butt-welded to one side of a center tunnel 4a formed at the center portion of the floor panel 4. On the circular arc of the doubler 3 a mounting boss 3a for mounting a front seat is provided and an installation hole 11a for installing a seat belt retractor is disposed at a lower portion of the center pillar inner panel 11.

Underneath the floor panel 4 at the left and right foot portions of the center tunnel 4a, as shown in FIG. 4a, there are provided with a left and right bracket 9, 9 to which a tunnel reinforcement 5 comprising an upper and lower panels is fixed at each end thereof by bolts and the like.

Thus, as indicated in FIG. 1, a body structure with a continuous closed cross section is constituted throughout the body cross section by the left and right center pillars 1, 1, the center roof brace 2, the left and right doublers 3, 3 and the tunnel reinforcement 5.

Figure 5A:
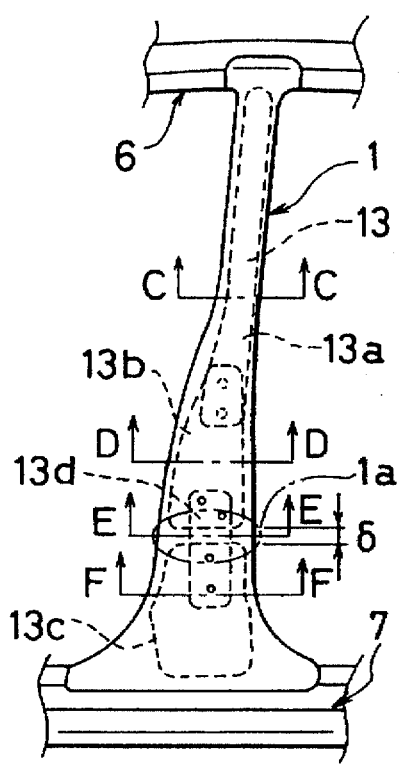
FIG. 5a is a side view showing a center pillar.
Figure 5B:
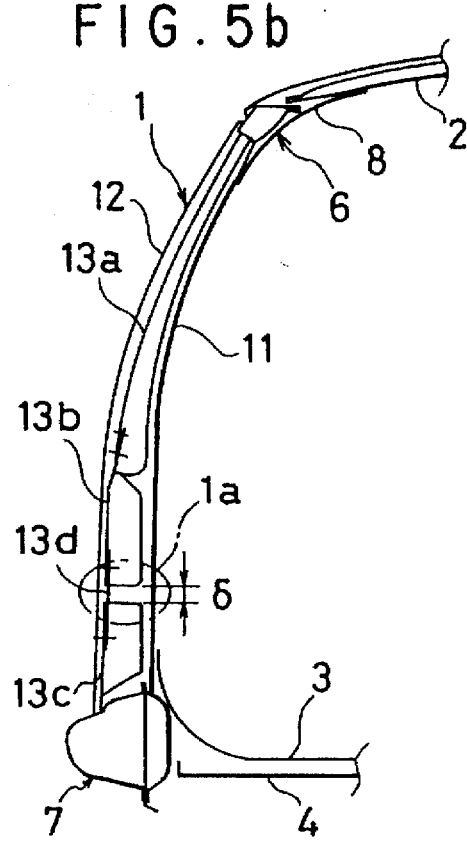
FIG. 5b is a cross sectional view showing a center pillar.

Next, the strength discontinuity portion 1a provided in the center pillar 1 will be described using an example of a specific structure as shown in FIGS. 5a and 5b.

Referring to FIG. 5a and FIG. 5b, a reinforcement 13 is fixed to the inside of the center pillar 1. The reinforcement 13 comprises an upper reinforcement 13a, a middle reinforcement 13b and a lower reinforcement 13c. The lower end of the upper reinforcement 13a is lap-welded to the upper end of the middle reinforcement 13b, however the lower end of the middle reinforcement 13b is separated from the upper end of the lower reinforcement 13c with a predetermined gap δ (for example approximate 5 mm). This separated portion δ between the middle reinforcement 13b and the lower reinforcement 13c is the strength discontinuity portion 1a of the center pillar 1.

The strength discontinuity portion 1a of the center pillar 1 is located near the intermediate portion between the center of the center pillar and the lower end thereof or slightly lower portion, specifically at the height of approximate 300 mm from ground (corresponding to the height of the front bumper of average passenger vehicles), although the height varies according to a height of the seat.

Figure 5C:
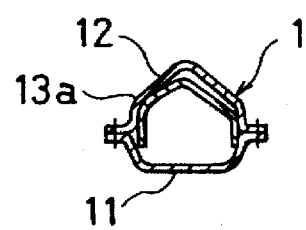
Figure 5E:
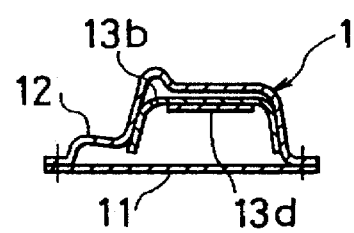
Figure 5D:
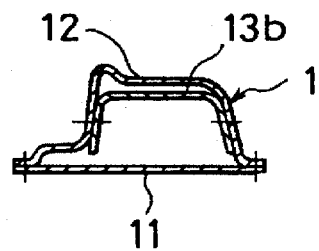

As shown in FIG. 5c, the upper reinforcement 13a has almost the same cross section as the upper portion of the center pillar outer panel 12 and it is disposed along the upper inside face of the center pillar outer panel 12. The upper reinforcement 13a is spot-welded at the both sides thereof with the center pillar outer 12. The middle reinforcement 13b, as shown in FIG. 5d, has a U-shaped cross section which has almost the same configuration as the middle portion of the center pillar outer panel 12 and it is disposed along the inside face of the center pillar outer panel 12. The both sides of the middle reinforcement 13b is spot-welded to the center pillar outer panel 12 and the upper end thereof is lap-welded to the lower end of the upper reinforcement 13a. This overlaped portion of the upper and middle reinforcements acts as reinforcing mounting flanges for mounting an upper door hinge and a door striker.

Figure 5F:
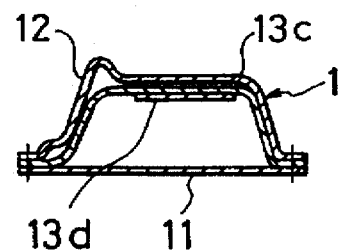
Figure 6A:
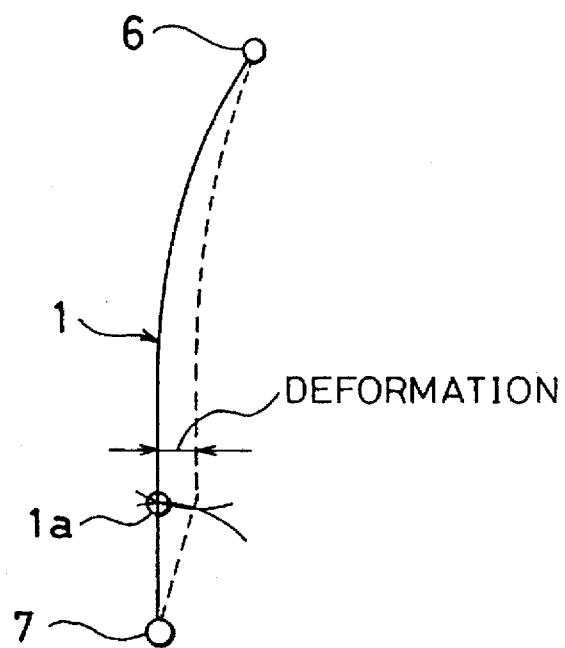
FIG. 6a is a drawing showing a pattern of a deformation of a center pillar according to the present invention.
Figure 6B:
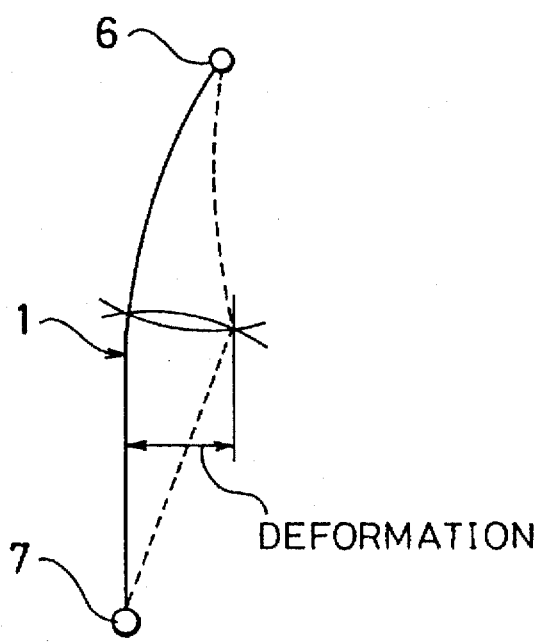
FIG. 6b is a drawing showing a pattern of a deformation of a center pillar according to a prior art.

The lower reinforcement 13c, as shown in FIG. 5f, has a U-shaped cross section which has almost the same configuration as the lower portion of the center pillar outer panel 12 and it is disposed along the inside face of the center pillar outer panel 12. The center pillar outer panel 12 and the center pillar inner panel 11 are spot-welded with the flanges of the lower reinforcement 13c between. The lower reinforcement 13c is for reinforcing mounting flanges for mounting a lower door hinge, a seat belt anchorage and a retractor.

In this embodiment, a connecting plate 13d is provided between the lower end of the middle reinforcement 13b and the upper end of the lower reinforcement 13c, however, since this connecting plate 13d has little reinforcement effect with respect to the load applied in the lateral direction, it may be omitted.

Furthermore, as described in this embodiment, separating the reinforcement into the upper reinforcement 13a and the middle reinforcement 13b has an advantage from the view point of blanking of materials and the overlapped structure by the upper reinforcement 13a and the middle reinforcement 13b is advantageous in tuning up the strength of the center pillar 1 to the strength of the largely changing portion of the cross section. However, integrating the upper and middle reinforcements into a single member may be functionally allowed as far as the strength discontinuity portion is substantially weakened in strength compared to the largely changing portion of the cross section at the center of the center pillar 1.

According to the body structure described above, when an opponent vehicle V collides laterally with the center pillar 1 of the vehicle, first the upper and lower ends thereof receive an input load. Then, the impact load is transferred through the upper and lower ends of the center pillar to the entire body structure having a closed cross section around the vehicle. At this time, since this closed cross sectional structure has a strong resistance against deformation, a relatively weakest portion, i.e., the strength discontinuity portion 1a yields and the center pillar bends around that strength discontinuity portion 1a in the inside direction of the vehicle. Finally, the impact load is dispersed broadly and an impact energy is effectively absorbed into the entire body.

When the center pillar 1 yields toward the inside of the vehicle at the strength discontinuity portion 1a, how it bends and to what extent it bends depends on the strength of other body structures such as other portions of the center pillar 1, the upper and lower ends thereof, the center roof brace 2, the doubler 3 and other joint members. Therefore, in order to find a desirable pattern of deformation of the center pillar 1 for minimizing an impact on the occupants, it is important to be able to adjust the strength of the center pillar 1 as easily as possible.

According to the embodiment of the present invention, the aforementioned tuning hole 8a and installation hole 11a are used for this purpose.

The strength discontinuity portion 1a can be accomplished in other ways than described in this embodiment. For an example, a single reinforcement 13 is put in the center pillar through the top to the bottom thereof, not being separated into three reinforcements 13a, 13b and 13c as described in the embodiment. On the single reinforcement welding beads are placed in the lengthwise direction of the vehicle so that the center pillar 1 is easy to bend around the point where the beads are placed. For another example, as shown in FIG. 7, an alternative way is to provide a bead at an appropriate position on the reinforcement 13 or the center pillar 1 for easy deformation thereof.

In summary, according to the present invention the cross sectional structure is constituted by the center roof brace having a closed cross section, the center pillar having a closed cross section, the doubler having a closed cross section formed by U-shaped channels and the floor panel and the center tunnel having a closed cross section formed by the center tunnel and the tunnel reinforcement. By connecting these structure members with each other, the cross sectional structure accomplishes a continuous closed cross section. Further, the center pillar has a strength discontinuity portion at the lower portion thereof. In the event of a side impact, the center pillar bends to an allowable extent toward the inside direction of the vehicle at the strength discontinuity portion without being deformed at the upper portion thereof. These structure members absorb the impact energy widely and effectively, whereby an impact on occupants can be minimized.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A passenger compartment structure of a motor vehicle with a left and right side having, right and left center pillars, each of said center pillars having an inner panel and an outer panel vertically erected at left and right sides, respectively, of said motor vehicle for bordering said compartment structure, a roof side rail forwardly and rearwardly extending from an upper position of each of said center pillars at said both sides, a side sill forwardly and rearwardly extending from a lower position of each of said center pillars at said both sides, a center roof brace formed of an upper panel, side panels, and a lower panel connected between both of said upper positions of said center pillars, a floor panel interposed between said both lower positions of said center pillars for covering an under side of said compartment structure, and a center tunnel structure mounted on a center position of said floor panel extending forwardly and rearwardly, comprising:

a joint member covering a portion of said center roof brace, side panels and lower panel, said joint member connected between said lower panel of said center roof brace and said inner panel of each of said center pillars to reinforce said upper positions of said center pillars;

a doubler connected between said lower position of each of said center pillars and said center tunnel structure for preventing said lower position of said center pillar from collapsing when another vehicle collides sidewardly;

a tunnel reinforcement attached under said center tunnel structure for strengthening said floor panel so as to minimize damage of said passenger compartment even if said center pillar is slightly bent when said another vehicle collides sidewardly;

a bracket for connecting the tunnel reinforcement to the tunnel; and a reinforcement interposed between said inner panel and said outer panel of each of said center pillars, said reinforcement having at least one strength discontinuity portion associated with each of said center pillars for bending when collision occurs from a side ward direction, said reinforcement being separated into an upper reinforcement and a lower reinforcement so as to prevent said center pillar from being bent at an upper position thereof;

where said compartment is defined by a continuous closed cross-section structure to provide increased passenger protection against injuries from side impact forces.

2. The passenger compartment structure according to claim 1, where said at least one strength discontinuity portion being at an approximately lower position of each of said center pillars.

3. The passenger compartment structure according to claim 1, wherein:

said joint member having a U-shaped cross section and a tuning hole to permit center pillar bending when the center pillar is subject to sidewardly direct impact forces;

said joint member being attached to mate with outer surfaces of said lower panel and said inner panel so as to be rigidly secure; and said joint member having a smoothly arced portion thereinside for abuttingly connecting said lower panel with said inner panel.

4. The passenger compartment structure according to claim 1, wherein:

said doubler has a smoothly arced portion for firmly fixing with an inner sill of said side sill and covers to contact with said inner panel.

5. The passenger compartment structure according to claim 1, wherein:

each said joint member has a tuning hole for enabling each of said center pillars to be easily deformed around said tuning hole when collision occurs from a sideward direction.

6. A passenger compartment structure of a motor vehicle with a left and right side having right and left center pillars, each of said center pillars having an inner panel and an outer panel vertically erected at left and right sides, respectively, of said motor vehicle for bordering said compartment structure, a roof side rail forwardly and rearwardly extending from an upper position of each of said center pillars at said both sides, a side sill forwardly and rearwardly extending from a lower position of each of said center pillars at said both sides, a center roof brace formed of an upper panel and a lower panel connected between both of said upper positions of said center pillars, a floor panel interposed between said both lower positions of said center pillars for covering an under side of said compartment structure, comprising:

a joint member connected between said lower panel of said center roof brace and said inner panel of each of said center pillars to reinforce said upper positions of said center pillars;

a doubler connected between said lower position of each of said center pillars for preventing said lower position of said center pillar from collapsing upon collision impact of another vehicle sidewardly; and a reinforcement element interposed between said inner panel and said outer panel of each of said center pillars, said reinforcement having at least one strength discontinuity portion associated with each of said center pillars for bending when collision occurs from a side ward direction, said reinforcement being separated into an upper reinforcement and a lower reinforcement so as to prevent said center pillar from being bent at an upper position thereof;

where said compartment is defined by a continuous closed cross-section structure which provides increased passenger protection against injuries from side impact forces.

7. The passenger compartment structure according to claim 6, where said at least one strength discontinuity portion is located at an approximately lower position of each of said center pillars for easily giving away so as to protect a passenger when collision occurs from a side ward direction.

8. The passenger compartment structure according to claim 6, wherein:

said joint member having a U-shaped cross section;

said joint member being attached to mate with outer surfaces of said lower panel and said inner panel so as to be rigidly secure; and said joint member having a smoothly arced portion thereinside for abuttingly connecting said lower panel with said inner panel.

9. The passenger compartment structure according to claim 6, wherein:

said doubler has a smoothly arced portion for firmly fixing with an inner sill of said side sill and covers to contact with said inner panel.

10. The passenger compartment structure according to claim 6, wherein:

each said joint member has a tuning hole for enabling each of said center pillars to be easily deformed around said tuning hole when collision occurs from a sideward direction.

11. A passenger compartment structure of a motor vehicle with a left and right side having, right and left center pillars, each of said center pillars having an inner panel and an outer panel vertically erected at left and right sides, respectively, of said motor vehicle for bordering said compartment structure, a roof side rail forwardly and rearwardly extending from an upper position of each of said center pillars at said both sides, a side sill forwardly and rearwardly extending from a lower position of each of said center pillars at said both sides, a center roof brace formed of an upper panel and a lower panel connected between both of said upper positions of said center pillars, a floor panel interposed between said both lower positions of said center pillars for covering an under side of said compartment structure, comprising:

a joint member connected between said lower panel of said center roof brace and said inner panel of each of said center pillars to reinforce said upper positions of said center pillars;

a doubler connected between said lower position of each of said center pillars for preventing said lower position of said center pillar from collapsing when another vehicle collides sidewardly;

a reinforcement interposed between said inner panel and said outer panel of each of said center pillars; and said reinforcement having a strength discontinuity portion at an approximately lower position of each of said center pillars for easily giving away so as to protect a passenger when collision occurs from a sideward direction.

12. A center pillar structure of a vehicle body having a roof side rail provided at an upper and side position of said vehicle to extend in a longitudinal direction thereof, a center roof brace transversely interposed between said roof side rails, a floor panel provided at a lower portion of said vehicle no form a floor of a passenger compartment, a side sill provided to extend at a lower and side position of said vehicle in parallel with said roof side rail, a reinforcement at the center pillar interposed between said roof side rail and said side sill, and a center tunnel provided on said floor panel to form a channel and to contain various equipments, comprising:

a joint member provided to directly connect said center roof brace with said center pillar;

a doubler provided with a first cross section in a lateral direction of said vehicle body to directly connect said side sill with said center tunnel, said doubler being positioned on said floor panel to establish a closed cross section;

a tunnel reinforcement provided under said center tunnel to connect each inside end of said doubler and said floor panel;

a bracket connecting said tunnel reinforcement and said doubler so as to firmly secure a bulkhead frame formed by said center pillars, said doubler, and said center roof brace to prevent said center pillar from breaking at a center position thereof when subject to sideward collision; and a strength discontinuity portion of said center pillar to provide a weaker portion of said center pillar by separating said center pillar reinforcement into an upper reinforcement and a lower reinforcement so as to prevent said center pillar from being bent at an upper position thereof and to protect a passenger when subject to sidewardly directed collision forces.

13. A center pillar structure of a vehicle body having a roof side rail provided at an upper and side position of said vehicle to extend in a longitudinal direction thereof, a center roof brace transversely interposed between said roof side rails, a floor panel provided at a lower portion of said vehicle to form a floor of a passenger compartment, a side sill provided to extend at a lower and side position of said vehicle in parallel with said roof side rail, a center pillar interposed between said roof side rail and said side sill, and a center tunnel provided on said floor panel to form a channel and to contain various equipments, comprising:

a joint member provided to directly connect said center roof brace with said center pillar;

a doubler provided with a first cross section in a lateral direction of said vehicle body to directly connect said side sill with said center tunnel, said doubler being positioned on said floor panel to establish a closed cross section;

a tunnel reinforcement provided under said center tunnel to connect each inside end of said doubler and said floor panel; and a bracket connecting said tunnel reinforcement and said doubler so as to firmly secure a bulkhead frame formed by said center pillars, said doubler, and said center roof brace to prevent said center pillar from breaking at a center position thereof when subject to sideward collision;

a center pillar reinforcement provided to reinforce said center pillar and to have a strength discontinuity portion at a lower position of said center pillar where said strength discontinuity portion provides a weaker portion of said center pillar than other portion thereof by separating said center pillar reinforcement into an upper reinforcement and a lower reinforcement so as to prevent said center pillar from being bent at an upper position thereof and to protect a passenger when subject to sidewardly directed collision forces.

14. The center pillar structure according to claim 13, wherein:

said tunnel reinforcement has a second closed cross section in said lateral direction of said vehicle body.

15. The center pillar structure accordingly to claim 13, wherein:

said center pillar forms a closed box shape cross section in said lateral direction of said vehicle body by an inner pillar and an outer pillar with a first hat-shaped cross section in said lateral direction.

16. The center pillar structure according to claim 13, wherein:

said center roof brace forms a closed box shape cross section in said lateral direction of said vehicle body by an upper panel and a lower panel with a hat-shaped cross section in said lateral direction.

17. The center pillar structure according to claim 15, wherein:

said joint member has a hat-shaped cross section provided to cover outside surfaces of said inner pillar and a lower panel; and an inner surface of said joint member provided with an arc portion in continuous connection with both inside contours of said inner pillar and said lower panel so as to avoid collapse when subject to sidewardly directed collision forces.

18. The center pillar structure according to claim 13, wherein:

said doubler has a hat-shaped cross section provided to cover an outside surface of said inner pillar and said floor panel;

said doubler has a continuous arc portion at a connecting position of said inner pillar and said floor panel; and said continuous arc portion smoothly connects with both inside contours of said inner pillar and said floor panel so as to collapse at said strength discontinuity portion when subject to sidewardly directed collision forces.

* * * * *